US007580843B2

(12) United States Patent
Chang et al.

(10) Patent No.: US 7,580,843 B2
(45) Date of Patent: Aug. 25, 2009

(54) SYNTHESIS SUBBAND FILTER PROCESS AND APPARATUS

(75) Inventors: Chih-Hsien Chang, Hsinchu (TW); Chih-Wei Hung, Kaohsiung (TW); Hsien-Ming Tsai, Tainan Shien (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 652 days.

(21) Appl. No.: 11/430,702

(22) Filed: May 8, 2006

(65) Prior Publication Data

US 2007/0083376 A1 Apr. 12, 2007

(30) Foreign Application Priority Data

Oct. 7, 2005 (TW) .............................. 94135146 A

(51) Int. Cl.
*G10L 19/00* (2006.01)
*G10L 13/00* (2006.01)
*G06F 17/14* (2006.01)

(52) U.S. Cl. ....................... 704/500; 704/269; 708/402; 375/240.2

(58) Field of Classification Search ....................... None
See application file for complete search history.

(56) References Cited

U.S. PATENT DOCUMENTS 5,508,949 A * 4/1996 Konstantinides ............ 708/402
5,809,474 A 9/1998 Park
6,094,637 A 7/2000 Hong
6,108,633 A 8/2000 Kolluru
6,199,039 B1 3/2001 Chen et al.
6,344,808 B1 * 2/2002 Taruki et al. .................. 341/65
7,076,471 B2 * 7/2006 Todoroki et al. ............ 705/402
7,509,294 B2 * 3/2009 Kim ........................... 705/500
2002/0173967 A1 11/2002 Law et al.

OTHER PUBLICATIONS

Sakamoto, T. et al. "A fast MPEG-audio layer III algorithm for a 32-bit MCU" IEEE transactions on Consumer Electronics, vol. 45. No. 3, Nov. 1999.*
Paik W. et al. "Design of a novel synthesis filter for real-time MPEG-2 audio decoder implementation of a DSP chip", IEEE Transactions on Consumer Electronics, vol. 45, No. 4, Nov. 1999.*
Konstantinides, K. "Fast subband filtering in MPEG audio coding," IEEE Signal Processing Letters, vol. 1, No. 2, Feb. 1994.*
Galabov, M. "Implementation of IMDCT block of an MP3 decoder through optimization of the DCT matrix," Radioengineering, vol. 13, No. 4, Dec. 2004.*

* cited by examiner

*Primary Examiner*—Matthew J Sked
(74) *Attorney, Agent, or Firm*—Stites & Harbison, PLLC; Juan Carlos A. Marquez, Esq.

(57) ABSTRACT

A synthesis subband filter apparatus is provided. The apparatus is used for processing 18 sets of signals which each includes 32 subband sampling signals in accordance with a specification providing 512 window coefficients. The apparatus includes a processor for processing the 18 sets of signals in sequence. The processor further includes a converting module and a generating module. The converting module is used for converting the 32 subband sampling signals of the set of signals being processed into 32 converted vectors by use of 32-points discrete cosine transform (DCT), and writing the 32 converted vectors into 512 default vectors with a first-in, first-out queue. The generating module is used for generating 32 pulse code modulation (PCM) signals, relative to the set of signals being processed according to a set of synthesis formulae proposed in this invention.

14 Claims, 3 Drawing Sheets

SYNTHESIS SUBBAND FILTER PROCESS AND APPARATUS

BACKGROUND OF THE INVENTION

1. Field of the Invention

The present invention relates to synthesis subband filter processes and apparatuses, in particular, this invention is related to the synthesis subband filtering processes and apparatuses in an audio decoder.

2. Description of the Prior Art

The MPEG (Motion Pictures Experts Group) audio signal specification provides standard encoding/decoding algorithms for audio signals. The algorithms in the MPEG specification can significantly reduce the requirement for data transmitting bandwidths and provide audio signals with low distortions. At present, the encoding/decoding algorithms in the MPEG specification are divided in to three layers: Layer I, Layer II, and Layer III.

The encoding algorithm in the MPEG specification first divides an original audio signal into 32 subband data with an analysis subband filter. Subsequently, based on psychoacoustic models simulating human ears, the encoding algorithm provides signals in different subband with different encoding bit to quantize the signals. After being framed, the quantized signals can then be stored or transmitted.

The decoding algorithm in the MPEG specification is reverse to the steps in the encoding algorithm. The encoded data is first frame unpacked and 32 subband data are then generated with re-quantization. At last, a synthesis subband filter can recover the original audio signal.

Compared with the encoding/decoding algorithms in MPEG-1 Layer I and Layer II specifications, those in the MPEG-1 Layer III (MP3) specification have two more steps. The first one is performing modified discrete cosine transform (MDCT) to the signals outputted from the analysis subband filter. The second one is performing the Huffinan encoding to quantized signals so as to achieve an optimized compression ratio. Correspondingly, the decoding algorithm in the MP3 specification has a step of Huffman decoding and a step of inverse modified discrete cosine transform, (IMDCT).

Synthesis subband filtering is the last step of the decoding algorithm in the MP3 specification. As mentioned in "Coding of moving pictures and associated audio for digital storage media at up to about 1.5 M bits/s" on ISO/IEC 11172-3 Information Technology, the step of synthesis subband filtering in this prior art sequentially converts 18 sets of subband sampling signals after IMDCT into 18 sets of pulse code modulation (PCM) signals; thus, the original audio signal is recovered. Please refer to FIG. 1, which illustrates the flowchart of synthesis subband filtering in this prior art.

Each set of the 18 sets of subband sampling signals after IMDCT respectively includes 32 subband sampling signals. Step S11 is inputting the 32 subband sampling signals being processed. Step S12 is converting the 32 subband sampling signals into 64 converted vectors by matrixing. Step S13 is writing the 64 converted vectors into 1024 default vectors (V) with a first-in, first-out queue. Step S14 is generating a set of first intermediate vectors (U) based on the 1024 default vectors (V). Step S15 is multiplying the set of first intermediate vectors (U) by the 512 window coefficients provided by the MPEG specification to generate 512 second intermediate vectors (W). Step S16 is generating 32 PCM signals based on the 512 second intermediate vectors (W).

As mentioned in "Fast Subband Filtering in MPEG Audio Coding" reported by Konstantinides and Konstantinos, etc. on IEEE Signal Processing Letters 1, 2, Feb. 1994 26-29, 1994, this prior art proposes a method for converting the 32 subband sampling signals into 32 converted vectors by 32-points discrete cosine transform (DCT). That is to say, the matrixing method in step S12 is replaced with 32-points DCT. With the proposed method, the number of converted vectors can be half reduced. The 1024 default vectors (V) are also reduced to 512 default vectors. In this way, the buffer space for storing the default vectors (V) is smaller.

As described above, step S14 through step S16 are generating PCM signals based on the default vectors (V) and the 512 window coefficients provided by the MPEG specification. According to prior arts, before generating the PCM signals, the default vectors (V) must be converted twice, respectively to the first intermediate vectors (U) and the second intermediate vectors (W). However, the conversions not only are complicated, but also require a large number of hardware resources, and takes much time.

Therefore, this invention provides a process and an apparatus for synthesis subband filtering. The process and apparatus according to this invention simplifies the generation of PCM signals into relations between default vectors V and window coefficients D. The problem of complicated calculation in prior arts can thus be solved.

SUMMARY OF THE INVENTION

One main purpose of this invention is providing a synthesis subband filter process. The process is performed on 18 sets of signals which each include 32 subband sampling signals. The subband sampling signals are in accordance with a specification providing 512 window coefficients ($D_0$~$D_{511}$).

According to one preferred embodiment of this invention, the 18 sets of signals are sequentially processed. The 32 subband sampling signals in the set of signals being processed are first converted into 32 converted vectors (V") by use of 32-points discrete cosine transform (DCT). The 32 converted vectors are then written into 512 default vectors ($V''_0$~$V''_{511}$) with a first-in, first-out queue. Subsequently, 32 pulse code modulation (PCM) signals ($S_0$~$S_{31}$) are generated according to the 512 default vectors ($V''_0$~$V''_{511}$), the specification and the following formulae:

$$S_{16} = \sum_{i=1,3,5,\dots,15} (-V''_{32i}) * D_{32i+16}$$

$$S_j = \sum_{i=0,2,4,\dots 14} V''_{32i+16+j} * D_{32i+j} + \sum_{i=1,3,5,\dots,15} (-V''_{32i+16-j}) * D_{32i+j}$$

$$\text{for } j = 0 \sim 15$$

$$S_{32-j} = \sum_{i=0,2,4,\dots 14} (-V''_{32i+16+j}) * D_{32i+32-j} + \sum_{i=1,3,5,\dots,15} (-V''_{32i+16-j}) * D_{32i+32-j}$$

$$\text{for } j = 1 \sim 15.$$

wherein i and j are both integer indexes ranging from 0 to 15.

The inventor of this invention also summarizes the relationship of the 512 window coefficients as: $D_{(512-k)}=-D_k$, wherein k is an integer index ranging from 1 to 255. With this symmetric relationship, the memory space for storing the window coefficients can be reduced as half of that in prior arts. Besides, based on the above formulae, the only differences between the two sets of window coefficients for generating the PCM signals $S_j$ and $S_{32-j}$ (j=1~15) are arrangement sequences and positive/negative signs. If $S_j$ and $S_{32-j}$ are calculated simultaneously, the frequency of accessing the window coefficients can be half reduced. Furthermore, the default vectors corresponding to the PCM signals $S_j$ and $S_{32-j}$ (j=1~15) are the same. Thus, simultaneously calculating $S_j$ and $S_{32-j}$ can also reduce the frequency of accessing the default vectors.

The 512 default vectors are stored in a buffer. According to the MPEG-1 Layer III standard, pre-shifting must be performed whenever converted vectors are written into the default vectors so as to conform to a first-in, first-out principle. To prevent from massively memory shifting, this invention proposes a buffer with a rotating index based on the above formulae.

The advantage and spirit of the invention may be understood by the following recitations together with the appended drawings.

BRIEF DESCRIPTION OF THE APPENDED DRAWINGS

DETAILED DESCRIPTION OF THE INVENTION

One main purpose of this invention is providing a synthesis subband filter process. The process is performed on 18 sets of signals which each include 32 subband sampling signals. The subband sampling signals are in accordance with a specification providing 512 window coefficients ($D_0$~$D_{511}$). In actual applications, the specification can be the MPEG-1 Layer III standard.

Figure 2:
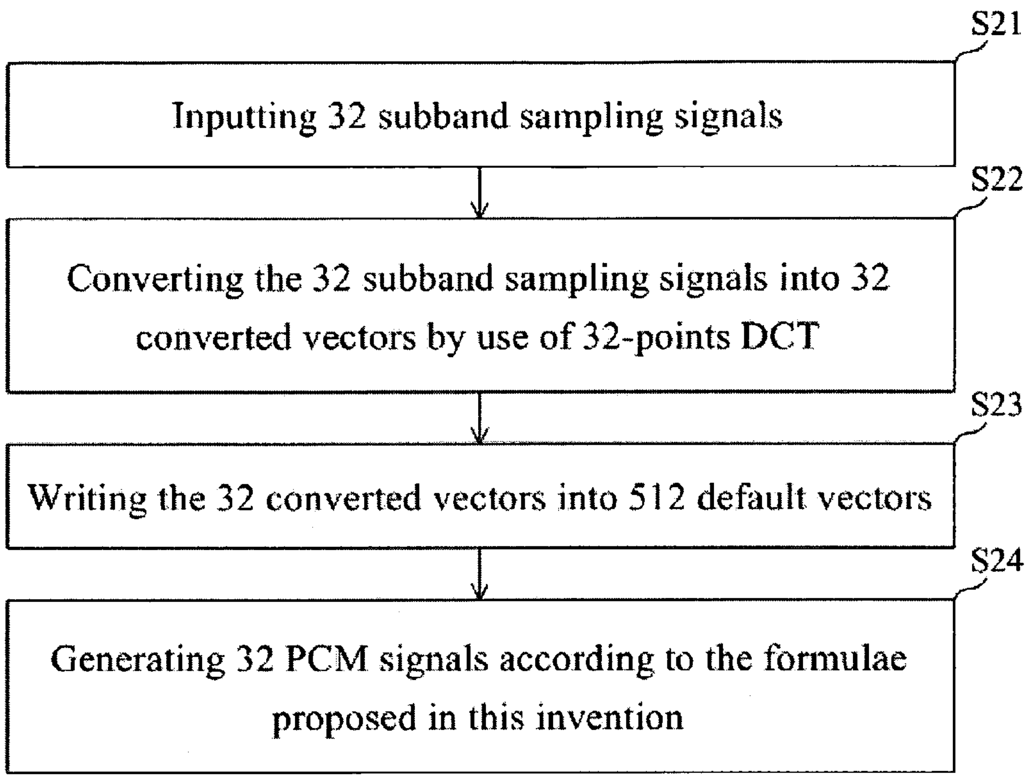
FIG. 2 is the flowchart of the synthesis subband filter process according to one preferred embodiment of this invention.

Please refer to FIG. 2, which illustrates the flowchart of the synthesis subband filter process according to one preferred embodiment of this invention. This process sequentially processes the 18 sets of signals and performs step S21 through step S24 for the set of signals being processed. Step S21 is inputting the 32 subband sampling signals being processed. Step S22 is converting the 32 subband sampling signals into 32 converted vectors by use of 32-points discrete cosine transform (DCT). Step S23 is writing the 32 converted vectors into 512 default vectors ($V''_0$~$V''_{511}$) with a first-in, first-out queue. Step S24 is generating 32 pulse code modulation (PCM) signals ($S_0$~$S_{31}$) according to the formulae proposed in this invention.

Figure 1:
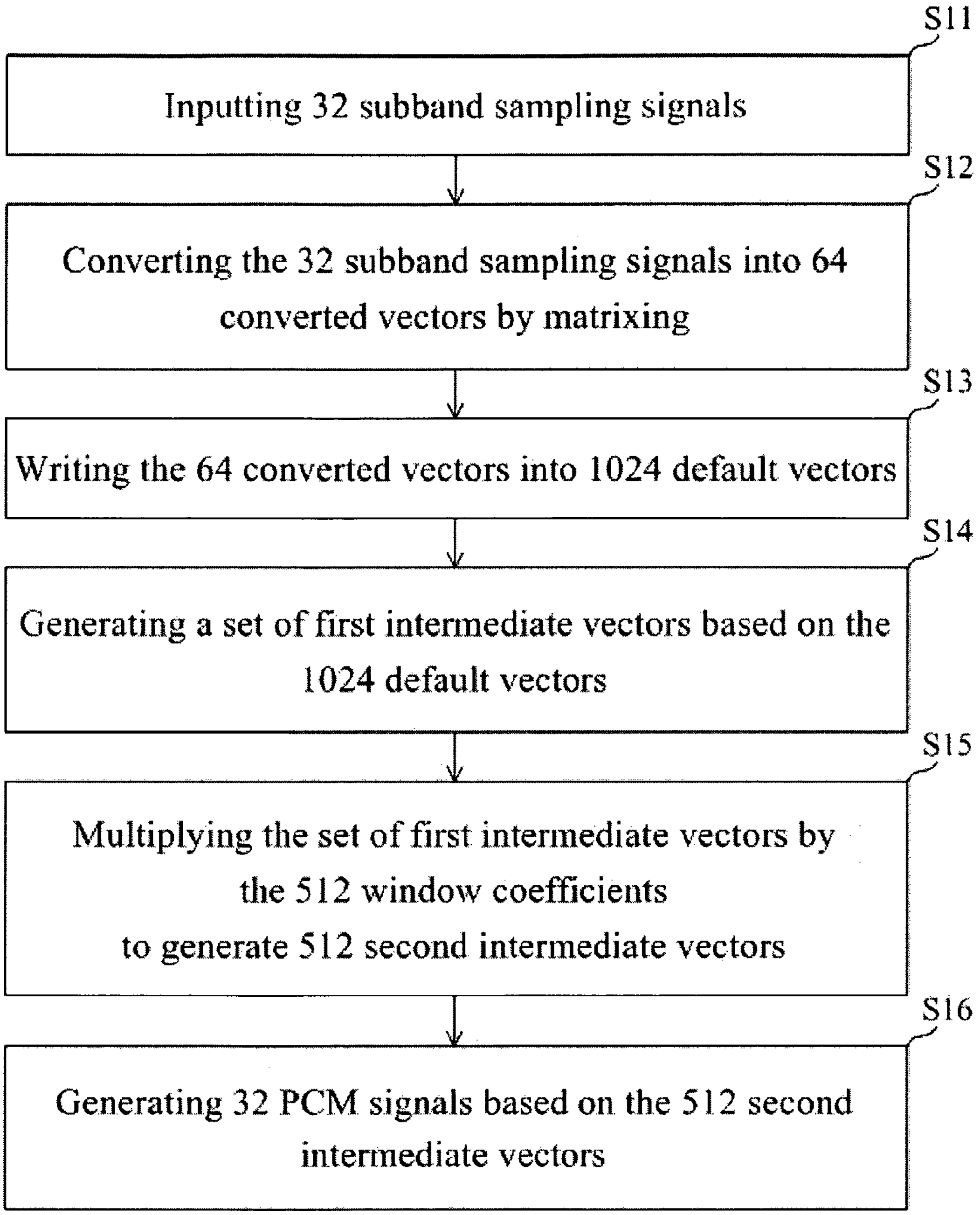
FIG.1 (Prior Art)
FIG. 1 illustrates the flowchart of synthesis subband filtering in the prior art.

The following paragraph will explain why step S12 in FIG. 1 can be replaced with step S22 in FIG. 2.

Step S12 is converting the 32 subband sampling signals ($S_k$, k=0~31) into 64 converted vectors ($V_i$, i=0~63) by matrixing according to the MPEG-1 Layer III standard. The matrixing equation is represented as:

$$V_i = \sum_{k=0}^{31} N_{i,k} * S_k, \text{ for } i = 0 \sim 63, \qquad \text{(Equation 1)}$$

wherein $$N_{i,k} = \cos\left[\frac{\pi}{64}(2k+1)(i+16)\right]$$

and is a matrix provided in the MPEG-1 Layer III standard.

A set of vectors $V'_i$ (i=0~63) can be defined to replace $V_i$:

$$V'_i = \begin{cases} V_{i+48} & \text{for } i = 0, 1, \ldots, 15 \\ V_{i-16} & \text{for } i = 16, 17, \ldots 63. \end{cases} \qquad \text{(Equation 2)}$$

Based on the definition of $N_{i,k}$ and Equation 2, Equation 1 can be re-written as Equation 3 and Equation 4:

$$V'_i = \sum_{k=0}^{31} \cos\left[\frac{\pi}{64}(2k+1)(i+64)\right] * S_k \text{ for } i = 0 \sim 15, \qquad \text{(Equation 3)}$$

$$V'_i = \sum_{k=0}^{31} \cos\left[\frac{\pi}{64}(2k+1)i\right] * S_k, \text{ for } i = 16 \sim 63. \qquad \text{(Equation 4)}$$

$V'_i$ (i=0~63) has been known as conformed to the relation of:

$$\begin{cases} V'_{32+j} = -V'_{32-j} & \text{for } j = 1, 2, \ldots, 16 \\ V'_{32+j} = V'_{32-j} & \text{for } j = 17, 18, \ldots, 31. \end{cases} \qquad \text{(Equation 5)}$$

Another set of vectors $V''_i$ (i=0~31) can be further defined to replace $V'_i$:

$$\begin{cases} V''_i = -V'_i & \text{for } i = 0, 1, \ldots, 15 \\ V''_i = V'_i & \text{for } i = 16, 17, \ldots, 31. \end{cases} \qquad \text{(Equation 6)}$$

Based on Equation 5 and Equation 6, Equation 3 and Equation 4 can be re-written as:

$$V''_i = \sum_{k=0}^{31} \cos\left[\frac{\pi}{64}(2k+1)i\right] * S_k \text{ for } i = 0 \sim 31. \qquad \text{(Equation 7)}$$

The relation between $V''_i$ and $S_k$ in Equation 7 is equivalent to performing 32-points DCT on $S_k$ to generate $V''_i$. Hence, the 32 vectors $V''_i$ can represent the vectors $V_i$.

The following paragraph will explain the details of step S22, S23, and S24.

In the MPEG-1 Layer im standard, the synthesis equation is originally defined as:

$$S_j = \sum_{i=0}^{15} U_{j+32i} * D_{j+32i} \text{ for } j = 0 \sim 31, \qquad \text{(Equation 8)}$$

wherein $S_j$ is the PCM signal to be finally generated, U represents a first intermediate vector, D represents the window coefficient provided in the MPEG-1 Layer III standard, and i is an integer index ranging from 0 to 15.

Based on the odd/even property of i, Equation 8 can be re-written as Equation 9:

$$S_j = \sum_{i=0,2,4,\ldots,14} U_{j+32i} * D_{j+32i} + \sum_{i=1,3,5,\ldots,15} U_{j+32i} * D_{j+32i}. \quad \text{(Equation 9)}$$

According to the MPEG-1 Layer III specification, the relationship between the first intermediate vector U and the 64 vectors $V_i$ is:

$$\begin{cases} U_{64w+j} = V_{128w+j} \\ U_{64w+32+j} = V_{128w+96+j} \end{cases}, \quad \text{(Equation 10)}$$

wherein w is an integer index ranging from 0 to 7.

Respectively setting i=2w and i=2w+1 for the two relations in Equation 10, the relationship between the first intermediate vector U and the 64 vectors $V_i$ can be re-written as:

$$\begin{cases} U_{32i+j} = V_{64i+j} & \text{for } i = 0, 2, 4, \ldots, 14, \\ U_{32i+j} = V_{64i+32+j} & \text{for } i = 1, 3, 5, \ldots, 15, \end{cases} \quad \text{(Equation 11)}$$

Based on Equation 11, Equation 9 can be written as:

$$S_j = \sum_{i=0,2,3,4,\ldots,14} V_{j+64i} * D_{j+32i} + \sum_{i=1,3,5,\ldots,15} V_{j+32+64i} * D_{j+32i} \quad \text{(Equation 12)}$$

Based on Equation 12, the $V_i$ respectively corresponding to $S_1$ and $S_{31}$ are listed as following:

The $V_i$ corresponding to even i in $S_1$:

$V_1, V_{128+1}, V_{256+1}, V_{384+1}, V_{512+1}, V_{640+1}, V_{768+1}, V_{896+1}$

The $V_i$ corresponding to odd i in $S_1$:

$V_{64+32+1}, V_{192+32+1}, V_{320+32+1}, V_{448+32+1}, V_{576+32+1}, V_{704+32+1}, V_{832+32+1}, V_{960+32+1}$

The $V_i$ corresponding to even i in $S_{31}$:

$V_{31}, V_{128+31}, V_{256+31}, V_{384+31}, V_{512+31}, V_{640+31}, V_{768+31}, V_{896+31}$

The $V_i$ corresponding to odd i in $S_{31}$:

$V_{64+32+31}, V_{192+32+31}, V_{320+32+31}, V_{448+32+31}, V_{567+32+31}, V_{704+32+31}, V_{832+32+31}, V_{960+32+31}$

Based on the symmetric property of DCT, the relationship between $V''_i$ and $V_i$ can be written as:

$$\begin{cases} V''_i = -V_{i+48} & i = 0 \sim 15 \\ V''_i = -V_{48-i} & i = 0 \sim 31 \\ V''_i = V_{i-16} & i = 16 \sim 31 \end{cases} \quad \text{(Equation13)}$$

Based on Equation 13, the $V''_i$ respectively corresponding to $S_1$ and $S_{31}$ are listed as following:

The $V''_i$ corresponding to even i in $S_1$:

$V''_{17}, V''_{64+17}, V''_{128+17}, V''_{192+17}, V''_{256+17}, V''_{320+17}, V''_{384+17}, V''_{448+17}$

The $V''_i$ corresponding to odd i in $S_1$:

$-V''_{32+15}, -V''_{96+15}, -V''_{160+15}, -V''_{224+15}, -V''_{288+15}, -V''_{352+15}, -V''_{416+15}, -V''_{480+15}$

The $V''_i$ corresponding to even i in $S_{31}$:

$-V''_{17}, -V''_{64+17}, -V''_{128+17}, -V''_{192+17}, -V''_{256+17}, -V''_{320+17}, -V''_{384+17}, -V''_{448+17}$

The $V''_i$ corresponding to odd i in $S_{31}$:

$-V''_{32+15}, -V''_{96+15}, "V"_{160+15}, -V''_{224+15}, -V''_{288+15}, -V''_{352+15}, -V''_{416+15}, -V''_{480+15}$

After analyzing the $V''_i$ in $S_1$ and $S_{31}$, the inventor find out that for $S_1$ and $S_{31}$, the $V''_i$ corresponding to odd i is the same and the $V''_i$ corresponding to even i are the same except a negative sign. Similarly, the $V''_i$ in $S_j$ and $S_{(32-j)}$ (j=1~15) has the unique relation, too. Hence, a set of equations can be summarized as:

$$S_j = \sum_{i=0,2,4,\ldots,14} V''_{32i+16+j} * D_{32i+j} + \sum_{i=1,3,5,\ldots,15} (-V''_{32i+16-j}) * D_{32i+j} \text{ for } j = 1 \sim 15 \quad \text{(Equation 14)}$$

$$S_{32-j} = \sum_{i=0,2,4,\ldots,14} (-V''_{32i+16+j}) * D_{32i+32-j} + \sum_{i=1,3,5,\ldots,15} (-V''_{32i+16-j}) * D_{32i+32-j} \text{ for } j = 1 \sim 15,$$

wherein i and j are both integer indexes ranging from 0 to 15.

After analyzing $S_0$ and $S_{16}$, another set of equations can be summarized as:

$$S_0 = \sum_{i=0,2,4,\ldots,14} V''_{32i+16} * D_{32i} + \sum_{i=1,3,5,\ldots,15} (-V''_{32i+16}) * D_{32i} \quad \text{(Equation 15)}$$

$$S_{16} = \sum_{i=1,3,5,\ldots,15} (-V''_{32i}) * D_{32i+16}$$

Based on Equation 14 and Equation 15, a fmal set of synthesis equations are summarized as:

$$S_{16} = \sum_{i=1,3,5,\ldots,15} (-V''_{32i}) * D_{32i+16}, \quad \text{(Equation 16)}$$

$$S_j = \sum_{i=0,2,4,\ldots,14} V''_{32i+16+j} * D_{32i+j} + \sum_{i=1,3,5,\ldots,15} (-V''_{32i+16-j}) * D_{32i+j} \text{ for } j = 0 \sim 15,$$

$$S_{32-j} = \sum_{i=0,2,4,\ldots,14} (-V''_{32i+16+j}) * D_{32i+32-j} + \sum_{i=1,3,5,\ldots,15} (-V''_{32i+16-j}) * D_{32i+32-j} \text{ for } j = 1 \sim 15,$$

wherein i and j are both integer indexes ranging from 0 to 15.

Based on the synthesis equations (Equation 16) proposed in this invention, there is no need of calculating the first intermediate vectors and the second intermediate vectors as in the prior arts. Hence, the synthesis subband filter process and apparatus according to the synthesis equations above are simpler than prior arts; thus, calculating time and hardware resources can be reduced in this invention.

Besides, the inventor of this invention also summarizes the relationship of the 512 window coefficients as: $D_{(512-k)}=-D_k$, wherein k is an integer index ranging from 1 to 255. With this symmetric relationship, the memory space for storing the window coefficients can be reduced as half of that in prior arts.

The vector $V''_i$ is stored in a buffer. Based on Equation 16, the $V''_i$ corresponding to the PCM signals $S_j$ and $S_{32-j}$ (j=1~15) are the same except positive/negative signs. Thus, simultaneously calculating $S_j$ and $S_{32-j}$ can reduce the frequency of accessing the $V''_i$ from the buffer.

Based on the relation of $D_{(512-k)}=-D_k$, the only differences between the two sets of window coefficients D for generating the PCM signals $S_j$ and $S_{32-j}$ (j=1~15) are arrangement sequences and positive/negative signs. If $S_j$ and $S_{32-j}$ are calculated simultaneously, the frequency of accessing the window coefficients can also be half reduced.

The volume of the buffer for storing $V''_i$ can be equal to 512 $V''_i$ or 256 $V''_i$. The vectors stored in the buffer are called default vectors. According to the MPEG-1 Layer III standard, whenever a set of subband sampling signals is converted into 32 converted vectors $V''_i$, the 32 converted vectors $V''_i$ must be written into the buffer with a first-in, first-out (FIFO) principle. In the prior arts, when a new $V''_i$ is going to be written into the buffer, the vectors originally stored in the buffer must be shifted backward so as to conform to the FIFO principle. To prevent from massively memory shifting, this invention proposes a buffer with a rotating index based on the synthesis equations (Equation 16). In the buffer with a rotating index, the positions for storing default vectors are fixed. The process and apparatus according to this invention change the sequence of accessing the default vectors instead of shifting the default vectors.

Figure 3:
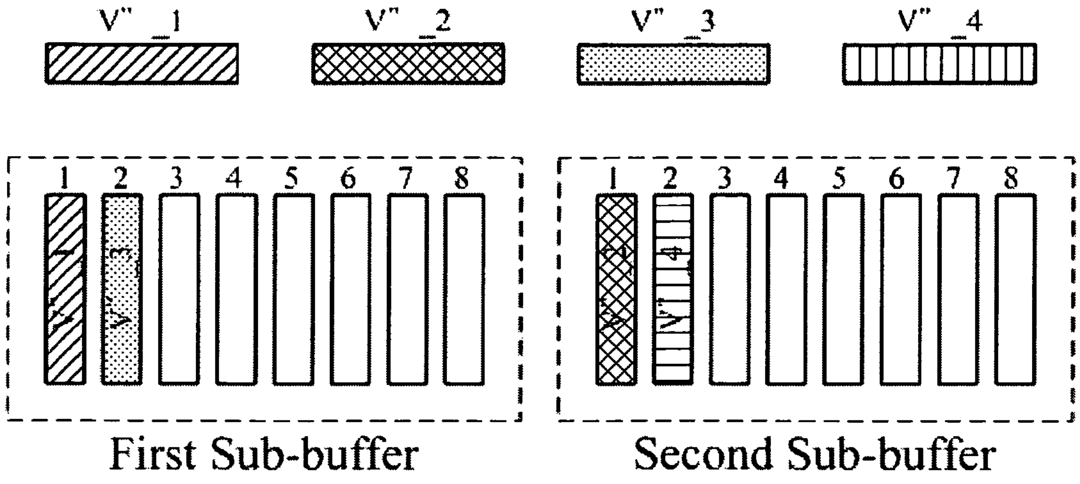
FIG. 3 illustrates the operation of the buffer with a rotating index.

Please refer to FIG. 3. FIG. 3 illustrates the operation of the buffer with a rotating index. In this example, the buffer is assumed as capable of storing 512 $V''_i$.

The buffer is divided into a first sub-buffer and a second sub-buffer. The 32 default vectors relative to the $s^{th}$ set of signals among the 18 sets of signals are stored in the first sub-buffer, if s is an odd number, or in the second sub-buffer, if s is an even number, wherein s is an integer index ranging from 1 to 18. For example, the 32 default vectors relative to the $1^{st}$, $3^{rd}$, $5^{th}$, $7^{th}$, $9^{th}$, $11^{th}$, $13^{th}$, $15^{th}$, and $17^{th}$ set of signals among the 18 sets of signals are stored in the first sub-buffer. And, the 32 default vectors relative to the $2^{nd}$, $4^{th}$, $6^{th}$, $8^{th}$, $10^{th}$, $12^{th}$, $14^{th}$, $16^{th}$, and $18^{th}$ set of signals among the 18 sets of signals are stored in the second sub-buffer.

The first sub-buffer and the second sub-buffer have eight sections, respectively. Each section is used for storing 32 default vectors among the 512 default vectors. The 32 default vectors among the 512 default vectors relative to the $s^{th}$ set of signals among the 18 sets of signals are stored in the $y^{th}$ section of the first sub-buffer where y equals [(s+1) mod 16]/2, or in the $y^{th}$ section of the second sub-buffer where y equals [s mod 16]/2, wherein y is an integer index ranging from 1 to 8. For instance, The 32 default vectors (V"_1) among the 512 default vectors relative to the $1^{st}$ set of signals among the 18 sets of signals are stored in the first section of the first sub-buffer. The 32 default vectors (V"_4) among the 512 default vectors relative to the $4^{th}$ set of signals among the 18 sets of signals are stored in the second section of the second sub-buffer.

When the 32 PCM signals relative to the $s^{th}$ set of signals among the 18 sets of signals are processed and the 512 default vectors are requested to be accessed, the eight sections in the first sub-buffer are accessed as the following sequence: $x^{th}$, $(x-1)^{th}$, . . . , $1^{st}$, $8^{th}$, $7^{th}$, . . . , $(x+1)^{th}$, wherein x equals [(s+1) mod 16]/2. The eight sections in the second sub-buffer will be accessed as the following sequence: $x^{th}$, $(x-1)^{th}$, . . . , $1^{st}$, $8^{th}$, $7^{th}$, . . . , $(x+1)^{th}$, wherein x equals [s mod 16]/2, as the 32 PCM signals are processed and the 512 default vectors are requested to be accessed.

Figure 4:
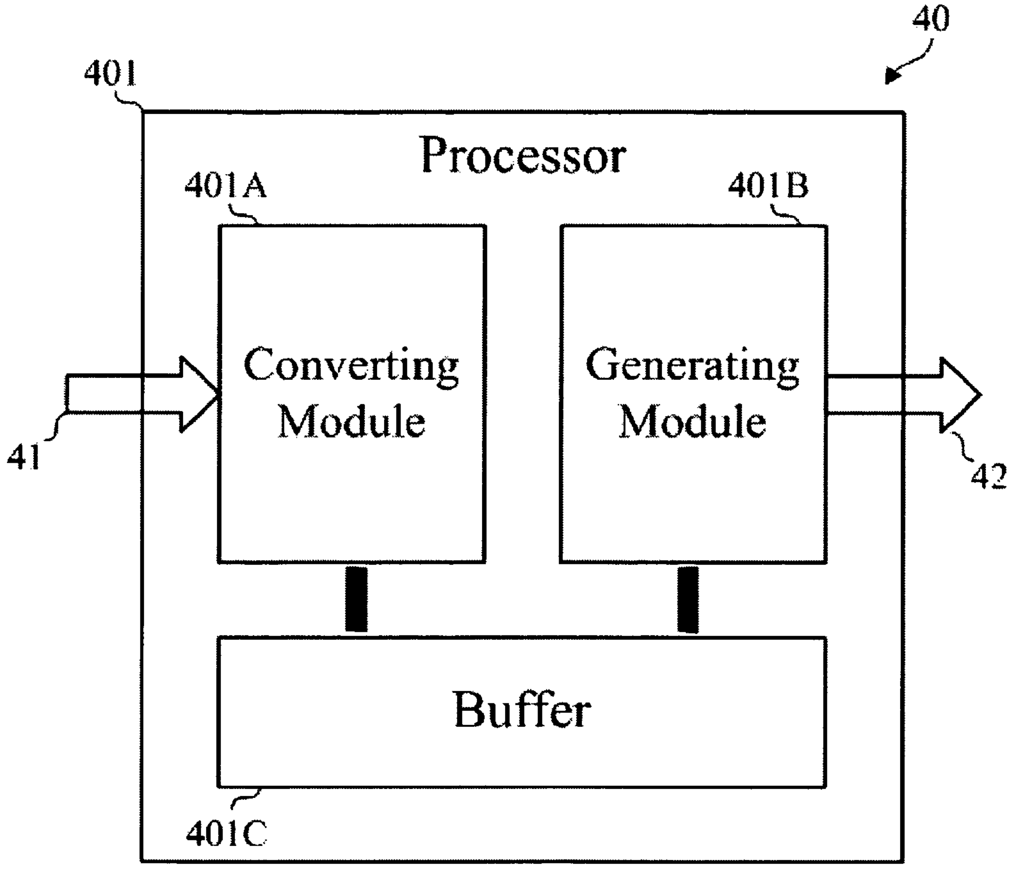
FIG. 4 is the block diagram of the synthesis subband filter apparatus according to one preferred embodiment of this invention.

Please refer to FIG. 4. FIG. 4 is the block diagram of the synthesis subband filter apparatus according to one preferred embodiment of this invention. The synthesis subband filter apparatus 40 includes a processor 401 for processing the 18 sets of signals in sequence. As shown in FIG. 4, the processor 401 further includes a converting module 401A, a generating module 401B, and a buffer 401C.

The converting module 401A converts the 32 subband sampling signals of the set of signals 41 into 32 converted vectors by use of 32-points DCT (Equation 7), The converting module 401A also writes the 32 converted vectors into 512 default vectors ($V''_0$~$V''_{511}$) in the buffer 401C with a first-in, first-out queue.

The buffer 401C connects with the converting module 401A and the generating module 401B, respectively. The buffer 401C includes a first sub-buffer and a second sub-buffer as described above, the 32 default vectors relative to the $s^{th}$ set of signals among the 18 sets of signals are stored in the first sub-buffer, if s is an odd number, or in the second sub-buffer, if s is an even number, and s is an integer index ranging from 1 to 18. Based on Equation 16 and the 512 default vectors ($V''_0$~$V''_{511}$) in the buffer 401C, the generating module 401B generates the 32 PCM signals ($S_0$~$S_{31}$) 42 relative to the set of signals being processed.

The principle of the synthesis subband filter apparatus 40 is the same as the flowchart shown in FIG. 2; thus, how the synthesis subband filter apparatus 40 operates is not further explained.

Similarly, in actual applications, the buffer 401C in the synthesis subband filter apparatus 40 can be a buffer with a rotating index as described above.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A synthesis subband filter process for 18 sets of signals which each comprises 32 subband sampling signals, the subband sampling signals being in accordance with a specification providing 512 window coefficients ($D_0$~$D_{511}$), said process comprising the steps of:

(a) sequentially processing said 18 sets of signals, and performing the following steps for said set of signals being processed:

(a-1) by use of 32-points discrete cosine transform (DCT), converting said 32 subband sampling signals into 32 converted vectors and writing said 32 converted vectors into 512 default vectors ($V''_0$~$V''_{511}$) with a first-in, first-out queue; and (a-2) generating 32 pulse code modulation (PCM) signals ($S_0$~$S_{31}$) according to the 512 default vectors ($V''_0$~$V'_{511}$), the specification and the following formulae:

$$S_{16} = \sum_{i=1,3,5,\ldots,15} (-V''_{32i}) * D_{32i+16},$$

-continued $$S_j = \sum_{i=0,2,4,\ldots,14} V''_{32i+16+j} * D_{32i+j} + \sum_{i=1,3,5,\ldots,15} (-V''_{32i+16-j}) * D_{32i+j} \text{ for } j = 0 \sim 15, \text{ and}$$

$$S_{32-j} = \sum_{i=0,2,4,\ldots,14} (-V''_{32i+16+j}) * D_{32i+32-j} + \sum_{i=1,3,5,\ldots,15} (-V''_{32i+16-j}) * D_{32i+32-j} \text{ for } j = 1 \sim 15,$$

wherein i and j are both integer indexes ranging from 0 to 15.

2. The process of claim 1, wherein the specification is MPEG-1 Layer III standard.

3. The process of claim 1, wherein the 512 window coefficients meet the following relationship:

$$D_{(512-k)} = -D_k,$$

wherein k is an integer index ranging from 1 to 255.

4. The process of claim 1, wherein the 512 default vectors are stored in a buffer divided into a first sub-buffer and a second sub-buffer, 32 default vectors relative to a $s^{th}$ set of signals among the 18 sets of signals are stored in the first sub-buffer, if s is an odd number, or in the second sub-buffer, if s is an even number, and s is an integer index ranging from 1 to 18.

5. The process of claim 4, wherein the first sub-buffer and the second sub-buffer have eight sections, respectively, each section is used for storing 32 default vectors among the 512 default vectors, the 32 default vectors among the 512 default vectors relative to the $s^{th}$ set of signals among the 18 sets of signals are stored in the $y^{th}$ section of the first sub-buffer where y equals [(s+1) mod 16]/2, or in the $y^{th}$ section of the second sub-buffer where y equals [s mod 16]/2, wherein y is an integer index ranging from 1 to 8.

6. The process of claim 5, wherein when the 32 pulse code modulation (PCM) signals relative to the $s^{th}$ set of signals among the 18 sets of signals are processed and the 512 default vectors are requested to be accessed in step (a-2), the first accessed section is one of the $y^{th}$ section of the first sub-buffer and the $y^{th}$ section of the second sub-buffer.

7. The process of claim 6, wherein the eight sections of the first sub-buffer and the second sub-buffer are accessed respectively in the following sequence:

$$y^{th}, (y-1)^{th}, \ldots, 1^{st}, 8^{th}, 7^{th}, \ldots, (y+1)^{th}.$$

8. A synthesis subband filter apparatus for 18 sets of signals which each comprises 32 subband sampling signals in accordance with a specification providing 512 window coefficients ($D_0$~$D_{511}$), said apparatus comprising:

a processor for processing said 18 sets of signals in sequence, the processor further comprising:

a converting module for converting the 32 subband sampling signals of said set of signals being processed into 32 converted vectors by use of 32-points discrete cosine transform (DCT), and writing said 32 converted vectors into 512 default vectors ($V''_0$~$V''_{511}$) with a first-in, first-out queue; and a generating module for generating 32 pulse code modulation (PCM) signals ($S_0$~$S_{31}$) relative to said set of signals being processed according to the 512 default vectors ($V''_0$~$V''_{511}$), the specification and the following formulae:

$$S_{16} = \sum_{i=1,3,5,\ldots,15} (-V''_{32i}) * D_{32i+16},$$

$$S_j = \sum_{i=0,2,4,\ldots,14} V''_{32i+16+j} * D_{32i+j} + \sum_{i=1,3,5,\ldots,15} (-V''_{32i+16-j}) * D_{32i+j} \text{ for } j = 0 \sim 15, \text{ and}$$

$$S_{32-j} = \sum_{i=0,2,4,\ldots,14} (-V''_{32i+16+j}) * D_{32i+32-j} + \sum_{i=1,3,5,\ldots,15} (-V''_{32i+16-j}) * D_{32i+32-j} \text{ for } j = 1 \sim 15,$$

wherein i and j are both integer indexes ranging from 0 to 15.

9. The apparatus of claim 8, wherein the specification is MPEG-1 Layer III standard.

10. The apparatus of claim 8, wherein the 512 window coefficients meet the following relationship:

$$D_{(512-k)} = -D_k,$$

wherein k is an integer index ranging from 1 to 255.

11. The apparatus of claim 8, wherein the processor further comprises a buffer connected with the converting module and the generating module respectively, the 512 default vectors are stored in the buffer including a first sub-buffer and a second sub-buffer, 32 default vectors relative to a $s^{th}$ set of signals among the 18 sets of signals are stored in the first sub-buffer, if s is an odd number, or in the second sub-buffer, if s is an even number, and s is an integer index ranging from 1 to 18.

12. The apparatus of claim 11, wherein the first sub-buffer and the second sub-buffer have eight sections, respectively, each section is used for storing 32 default vectors among the 512 default vectors, the 32 default vectors among the 512 default vectors relative to the $s^{th}$ set of signals among the 18 sets of signals are stored in the $y^{th}$ section of the first sub-buffer where y equals [(s+1) mod 16]/2, or in the $y^{th}$ section of the second sub-buffer where y equals [s mod 16]/2, wherein y is an integer index ranging from 1 to 8.

13. The apparatus of claim 12, wherein when the 32 pulse code modulation (PCM) signals relative to the $s^{th}$ set of signals among the 18 sets of signals are processed and the 512 default vectors are requested to be accessed by the generating module, the first accessed section is one of the $y^{th}$ section of the first sub-buffer and the $y^{th}$ section of the second sub-buffer.

14. The apparatus of claim 13, wherein the eight sections of the first sub-buffer and the second sub-buffer are accessed respectively in the following sequence:

$$y^{th}, (y-1)^{th}, \ldots, 1^{st}, 8^{th}, 7^{th}, \ldots, (y+1)^{th}.$$

* * * * *